July 25, 1944.  J. E. HALE  2,354,437
BEAD LOCK
Filed Sept. 11, 1941
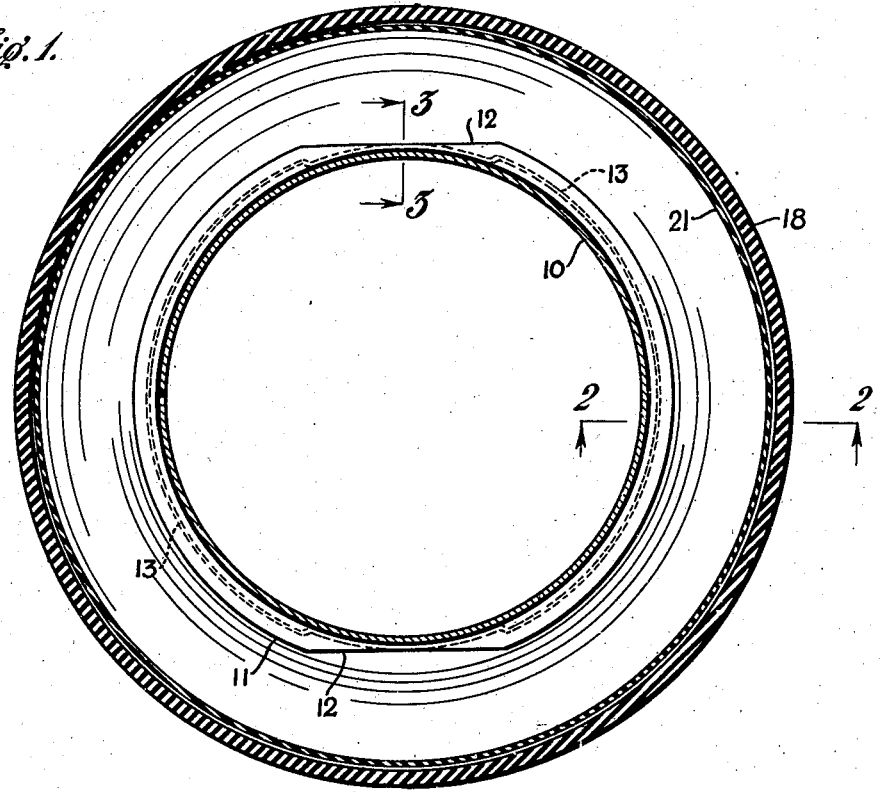
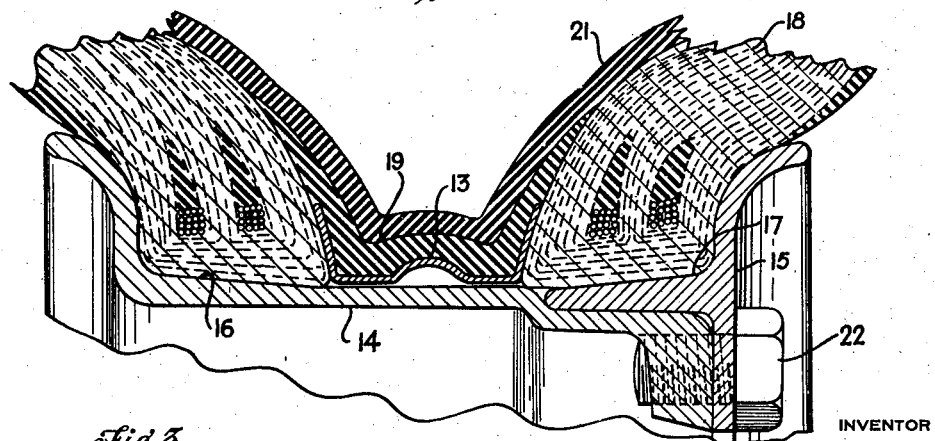
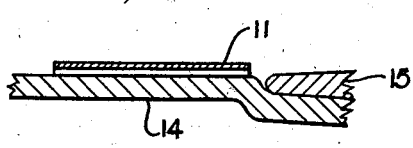
INVENTOR
James E. Hale
BY
Ely & Frye
ATTORNEYS Patented July 25, 1944

2,354,437

UNITED STATES PATENT OFFICE 2,354,437

BEAD LOCK

James E. Hale, Akron, Ohio, assignor to The Firestone Tire & Rubber Company, Akron, Ohio, a corporation of Ohio Application September 11, 1941, Serial No. 410,458

3 Claims. (Cl. 152—400)

This invention relates to bead locks for tire and rim assemblies, and more especially to bead locks adapted to retain a pneumatic tire casing on a tire rim, in torque-transmitting engagement therewith, even when the tire is under-inflated or else completely deflated.

When a pneumatic tire is mounted upon a conventional tire rim of the type that is substantially cylindrical and has a removable flange or side-ring on one edge thereof, it is obvious that the inside diameter of the tire beads must be somewhat larger than the bead seat diameter of the rim in order that the tire readily and conveniently can be applied to the rim, or removed therefrom, by the simple act of telescoping the tire beads over the rim.

In the driving of a motor vehicle, or in the braking thereof, the torques producing the change of motion of the vehicle must be transmitted through the tire without resulting slippage or creeping of the tire relatively of the rim. With properly inflated tires there is sufficient lateral pressure against the vertical faces of the tire beads to assure obtaining sufficient frictional contact between the outer lateral faces of the tire beads and the tire-rim-flanges to resist said slippage or creeping.

It is possible to compute the forces developed by the lateral pressure of the vertical faces of the tire beads against the rim flanges and demonstrate that if the pressure is adequate there is no need of auxiliary means to provide the driving or traction force, or braking resistance for the vehicle. However, if the air pressure in the tire becomes low in relation to the prescribed air pressure, or if the tire becomes completely deflated, then the absence of laterally outwardly directed pressure against the beads results in an absence of sufficient friction between the outer vertical walls of the tire beads and rim flanges sufficient to translate the said tractive and/or braking forces. Since such conditions are not of infrequent occurrence, it is desirable that supplemental means be provided for urging the tire beads outwardly into tight frictional engagement with the tire rim flanges.

When a circumferentially divided wheel or rim is used, it is possible to form tapered bead seats thereon that positively engage with the radially inner surfaces of the tire beads and provide a force which resists relative rotational movement between the pneumatic tire and the rim or wheel mounting same even though the tire is deflated. However, even with such rim or wheel constructions, it is necessary to provide positive means for forcing the outer vertical faces of the beads into frictional contact with the rim or wheel flanges to insure against relative rotational movement between the tire and the means mounting same under all operating conditions.

Attempts have been made to provide pneumatic tire and rim assemblies that can be operated, even though the pneumatic tire thereof is deflated, without causing rotation of the tire relatively of the rim, and without pulling the tire off the rim. Such assemblies generally involve the use of some type of an annular elastic compression member which is carried within a tire on the wheel or rim, and adapted to exert pressure upon the beads of a mounted tire to force the same laterally against the rim flanges. However, such continuous compressible members are costly, and are made from a mass of rubber, or similar composition, which may be difficult to obtain, or which may be difficult to insert in a tire, or which may heat up excessively in use.

The chief object of the invention is to provide mechanical means for producing a definite laterally directed pressure against the beads of a tire to force them against the flanges of a rim on which the tire is mounted, even when the tire is deflated. Such means may be termed a bead lock.

Another object of the invention is to provide an improved bead lock for a pneumatic tire assembly, which bead lock effectively retains the tire beads in fixed relation to a tire rim, and overcomes the aforementioned disadvantages of prior art constructions.

Another object is to provide a bead lock structure adapted for use with standard flat base tire rims that have either a continuous or a discontinuous removable side flange thereon ordinarily received in a gutter formed in one margin of the rim base, or for use with circumferentially divided rims or wheels.

Still another object is to retain a pneumatic tire on a tire rim so that the tire beads are held in fixed torque transmitting contact with the rim flanges regardless of the volume or pressure of air within the tire.

A further object of the invention is to provide apparatus for locking pneumatic tire beads in place and making the vehicle mounted on such tire maneuverable even though the tire is deflated.

Another object is to devise a bead lock which may be inserted in a tire with facility, even though the tire casing and beads are made so extremely heavy that they may carry their load without inflating air pressure.

Another object of the invention is to provide an easily manufactured, readily positionable, metallic bead lock adapted to force substantially the entire circumference of the outer vertical walls of tire beads into engagement with rim flanges.

Further objects will be manifest as the specification proceeds.

In the accompanying drawing:

Figure 1 is an elevation of a bead lock embodying the invention, as mounted in a pneumatic tire and rim assembly, the tire and rim being shown in section;

Figure 2 is a transverse section taken on line 2—2 of Figure 1; and

Figure 3 is a fragmentary section taken on line 3—3 of Figure 1.

Referring to the drawing, a rim or wheel 10 of any desired construction is shown on which is mounted an endless annular bead lock 11 which is channel shaped in section, as shown in Figure 2. The bead lock 11 has a local diametric region or portion 12, 12 of reduced outside diameter which portion is formed by removing chordal segments of both arms of the channel 11 on parallel planes that are tangent to the base of the channel. In some cases, other regions of the channel arms, or other shaped sections of the arms may be removed to facilitate inserting the bead lock in a tire. Intermediate the reduced diameter region of the channel member 11, a circumferentially directed, outwardly extending reinforcing rib 13 is formed in the base of the channel. This reinforcing rib 13 is interrupted adjacent each of the regions 12, 12, as indicated in Figure 1.

Figure 2 best shows that the rim or wheel 10 is circumferentially divided and includes a rim base 14 to which an annular side ring 15 is secured to complete the rim assembly. Preferably, the rim 10 has tapered bead seats 16 and 17 so that the radially inner portions of the beads of a tire 18 carried on the rim can be positively gripped by the rim. A flap 19, made from rubber or rubberized fabric, may be carried on the outer surface of the channel member 11 in order to protect a tube 21 positioned in the tire 18.

The annular channel member 11 is positioned between the beads of the tire 18 by first inserting one portion of the channel member, intermediate the reduced diameter region thereof between the beads of the tire 18. Then the member 11 is progressively worked between the tire beads with the reduced diameter section 12, 12 being of such length as to facilitate such positioning operation. Obviously, the tube 21 and the flap 19 are positioned within the tire 18 before the channel member 11 is inserted therein. After the bead lock is placed within a tire, then the tire and tube assembly, with the bead lock therein, can be telescoped over the rim base 14 before the side ring 15 is applied. Finally the rim side ring is placed on the rim base and drawn into proper position thereon by bolts 22 whereby the inner vertical faces of the beads of the tire 18 are forced against the channel member 11 by the rim flanges. Or, conversely, the channel member 11 forces the outer vertical faces of the tire beads into tight frictional engagement with the rim flanges so that the tire is positively held on the rim regardless of the amount of inflation of the tire. In some cases, it may be desirable to use a special construction in making the tire 18, which construction varies from standard practice in that an extra layer or ply may be secured to the inner surface of the tire in order to strengthen same and enable the tire to support its normal load without excessive deflection whereas standard tire constructions collapse completely if loaded when not inflated.

What is claimed is:

1. A bead lock for pneumatic tire and rim assemblies, said bead lock comprising an annular member which is channel shape in section and which has diametrically opposed portions whereat the arms of said channel are removed and the outer edges of the channel arms define parallel tangents to the base of the channel, said annular member being planar in section at the points of tangency, said member having an outwardly extending circumferentially directed rib formed therein between the planar portions thereof.

2. A bead lock for pneumatic tire and rim assemblies, said bead lock comprising an endless member which is channel shape in section, and which has diametrically opposed regions whereat the arms of said channel have chordal segments removed therefrom, said member having an outwardly directed longitudinally extending reinforcing rib formed thereon intermediate the regions of reduced diameter thereof.

3. A bead lock for insertion between the beads of a pneumatic tire in tire and rim assemblies, said bead lock comprising an endless member which is channel shape in section with the arms of the channel extending outwardly from the member, said member having chordal segments of the channel arms removed from diametrically opposite regions of its periphery so as locally to reduce the outside diameter of the member to facilitate inserting it between the beads of a tire, said member being adapted to force the outer vertical faces of tire beads into contact with the flanges of a rim on which the member and a tire are mounted substantially throughout their entire extent.

JAMES E. HALE.